April 1, 1924.
R. R. REINEWALD
ARTIFICIAL FISH BAIT
Filed March 15, 1923
1,489,043
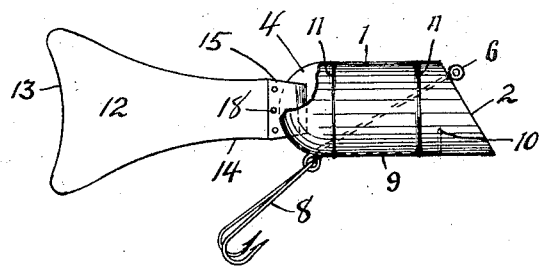
Fig. 1.
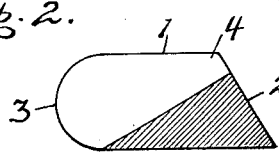 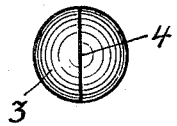 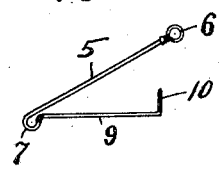
Fig. 2.   Fig. 3.   Fig. 4.
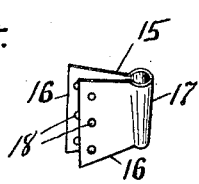
Fig. 5.
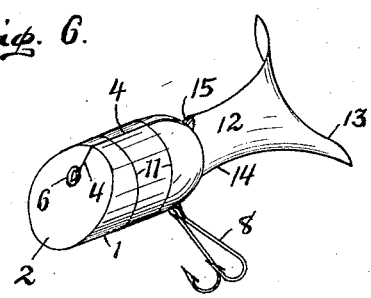
Fig. 6.
Raymond R. Reinewald, INVENTOR
BY
H. F. Burns ATTORNEY Patented Apr. 1, 1924.

1,489,043

UNITED STATES PATENT OFFICE.

RAYMOND R. REINEWALD, OF FORT WAYNE, INDIANA.

ARTIFICIAL FISH BAIT.

Application filed March 15, 1923. Serial No 625,219.

*To all whom it may concern:*

Be it known that I, RAYMOND R. REINEWALD, a citizen of the United States of America, and resident of Fort Wayne, in the county of Allen and State of Indiana, have invented certain new and useful Improvements in Artificial Fish Baits, of which the following is a specification.

This invention relates to improvements in artificial fish bait of that class in which a buoyant body having a lure and hooks attached thereto is employed, and in which the body is so shaped as to effect a wobbling motion when drawn through the water. The object of the improvement is to provide a securing means for attaching the hooks to the body so formed and applied as to serve also as ballast for the body. Another object is to provide a lure that may be easily detached from the body and replaced by other lures selectively according to the angler's fancy. A further object is to provide a lure in connection with a wobbling bait body so constituted as to effect a wavering movement when drawn through the water, which movement is augmented by the wobbling movement of the body to which it is attached, thus, adding to the liveliness of the bait when in action.

These objects are accomplished by the construction illustrated in the accompanying drawings, in which:—

Fig. 1 is a side elevation of a construction embodying the invention, a portion thereof being broken away;

Fig. 2 is a longitudinal section of the bait body;

Fig. 3 is a rear end elevation of the body;

Fig. 4 is a side elevation of the hook anchor;

Fig. 5 is a perspective view of the detachable conection for the lure; and

Fig. 6 is a perspective view of the bait as it appears in action.

The characters appearing in the description refer to parts shown in the drawings and designated thereon by corresponding characters.

The invention comprises a cylindrical bait body preferably formed with a declining front face 2 and a rounded rear end 3. In the smaller sizes, especially, the body may be made of cork. A vertical slit 4 is made in the top of the body that extends from the upper front end to the lower rear end, the slit extending at its bottom diagonally downward. In the bottom of the slit is positioned the shank 5 of an anchor formed of a wire with an eye 6 at the front end of the shank for the atachment of a line (not shown), and with a loop 7 at the opposite end of the shank for the attachment of hooks 8, the shank being of such length that the eye will extend beyond the front face, while the loop 7 depends from the lower rear end of the body. The anchor has an extension 9 contiguous with the loop, which extension has an upturned spur 10 at its forward end. When the anchor is in place in the body the extension and spur are embedded in the bottom of the body, and a pair of wire loops 11 are secured tightly about the body encompassing the extension 9 to secure it in place and to bind the slit upper portion of the body together.

The lure consists of a tail 12 formed of a thin sheet of soft rubber and fashioned in imitation of the tail of a fish, the rear end 13 being broad and the forward end 14 being comparatively long and narrow. A connection 15 is secured to the front end of the tail and is formed of thin sheet metal folded so as to present a pair of wings 16 extending rearwardly from a tapering enlargement 17 at the fold. Each wing has a series of perforations 18, and the connection being formed so that its wings tend to bear against each other, the end 14 of the tail is held clamped between the wings with more or less force so that portions of the soft rubber sheet become expanded into the openings, thus securing the tail in the connection. The tail is secured to the body through the medium of the connection which is manually forced into the slit 4 at the rear end of the body so that its enlargement is frictionally held between the sides of the body.

It is the intention to provide several tails distinguishable from each other in color to be interchangeably attached to the body so that the character of the bait may be thus altered.

In the operation of the bait, the hooks 8 and the lower portion of the anchor tend to balance the body in the water while it is drawn forwardly, and the body being shaped with a declining front face assumes a wobbling course. The tail being very pliable, and shaped with a broad rear end, tends to waver as it is drawn in the wake of the body, which becomes more pronounced because of the wobbling course of the body.

What I claim is:

1. In an artificial fish bait, a buoyant body having a slanting front face and a slit in its back extending downwardly from its upper front end to its lower rear end; an anchor formed with a shank with an eye at one end thereof and a loop at its opposite end, there being an extension contiguous with said loop and a spur at the front end of the extension, said shank extending through said body at the bottom of said slit, and the extension being imbedded in the bottom of the body; hooks attached to said anchor; means extending around the body securing the extension in place and holding the sides of the body together; a flexible tail; and a connection fixed on the front end of the tail and detachably secured in said slit at the rear end of said body.

2. In an artificial fish bait, a wobbling buoyant body having a slit rear end; hooks in connection with the body; a connection having a tapering enlargement detachably positioned in the slit in the body; and a flexible wavering tail secured in said connection.

3. In an artificial fish bait, the combination of a wobbling body member including hooks supported thereby; a detachable connection rigidly secured in the rear end of said body; and a flexible wavering tail secured in said connection.

4. In an artificial fish bait, a buoyant body having a slit in its back; a body balancing anchor having a shank with an eye at one end thereof and a loop at its opposite end, and having also an extension contiguous with the loop, said shank being positioned in the bottom of said slit, and said extension being positioned longitudinally along the bottom of the body; means extending around the body binding the sides thereof together and securing the anchor in place; and hooks secured in said loop.

5. In an artificial fish bait having a buoyant body and hooks supported thereby; a detachable connection having a pair of wings and a tapering enlargement connecting said wings; and a wavering sheet rubber tail secured to the connection between said wings, said connection being detachably secured in said body.

In testimony whereof I affix my signature in presence of two witnesses.

RAYMOND R. REINEWALD.

Witnesses:
MATILDA METTLER,
WALTER G. BURNS.